United States Patent
Kaplan et al.

(10) Patent No.: US 10,152,344 B2
(45) Date of Patent: Dec. 11, 2018

(54) COUPLING A NETWORK INTERFACE CARD (NIC) OF A HOST SYSTEM TO A VIRTUAL MACHINE

(71) Applicant: Red Hat Israel, Ltd., Raanana (IL)

(72) Inventors: Alona Kaplan, Raanana (IL); Michael Kolesnik, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 161 days.

(21) Appl. No.: 15/240,906

(22) Filed: Aug. 18, 2016

(65) Prior Publication Data
US 2018/0052702 A1    Feb. 22, 2018

(51) Int. Cl.
*G06F 9/455* (2018.01)
*G06F 17/30* (2006.01)
*H04L 12/935* (2013.01)

(52) U.S. Cl.
CPC .... *G06F 9/45558* (2013.01); *G06F 17/30864* (2013.01); *G06F 2009/45595* (2013.01); *H04L 49/30* (2013.01)

(58) Field of Classification Search
None
See application file for complete search history.

(56) References Cited

U.S. PATENT DOCUMENTS

| | | | |
|---|---|---|---|
| 7,743,389 B2 | 6/2010 | Mahalingam et al. | |
| 7,945,436 B2 | 5/2011 | Ang et al. | |
| 7,971,203 B2 | 6/2011 | Lantz et al. | |
| 8,392,623 B2 | 3/2013 | Subramanian et al. | |
| 8,464,259 B2 | 6/2013 | Belay | |
| 8,707,417 B1 | 4/2014 | Liang et al. | |
| 8,856,788 B2 | 10/2014 | Tsirkin et al. | |
| 2014/0289728 A1* | 9/2014 | Mitsunobu | G06F 9/45558 718/1 |
| 2016/0062940 A1 | 3/2016 | Cota-Robles | |

OTHER PUBLICATIONS

VMware, VMware vSphere 4—ESX and vCenter Server, "Virtual Machine Functions that Can Result in Data Loss with USB Devices," retrieved Jul. 6, 2016, 1 page.
VMware, VMware vSphere 4—ESX and vCenter Server, "Add a USB Passthrough Device to a Virtual Machine," retrieved Jul. 5, 2016, 1 page.

* cited by examiner

*Primary Examiner* — Bing Zhao
(74) *Attorney, Agent, or Firm* — Lowenstein Sandler LLP

(57) ABSTRACT

A mechanism for managing virtual machines in a virtualization system is disclosed. A method of implementation of the disclosure includes receiving a request from a client system to route network traffic from a first network interface card (NIC) of a first host system to a virtual machine. A determination may be made as to whether network traffic to another virtual machine is routed through the first NIC of the first host system. A notification may be sent to the client system indicating that the network traffic to the other virtual machine is routed through the first NIC and identifying a second NIC of a second host system that is available. The second NIC may be associated with the virtual machine to route network traffic from the second NIC to the virtual machine.

21 Claims, 5 Drawing Sheets

COUPLING A NETWORK INTERFACE CARD (NIC) OF A HOST SYSTEM TO A VIRTUAL MACHINE

TECHNICAL FIELD

Aspects of the present disclosure are generally related to virtualization systems, and more particularly to coupling host systems to virtual machines in a virtualization system.

BACKGROUND

Virtualization may be viewed as an abstraction of some physical components into logical objects to allow running various software modules on one or more interconnected physical computer systems. The various software modules may run concurrently or in isolation from other software modules. Virtualization allows, for example, consolidating multiple physical servers into one physical server running multiple virtual machines to improve a hardware utilization rate.

Virtualization may be achieved by the hardware and below the virtual machines. A hypervisor may run directly on the server hardware without an operating system beneath it or as an application running under a traditional operating system. The hypervisor may abstract the physical layer and present this abstraction to virtual machines to use, by providing interfaces between the underlying hardware and virtual devices of virtual machines. A network interface card (NIC) is a hardware interface that connects a host system to one or more virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
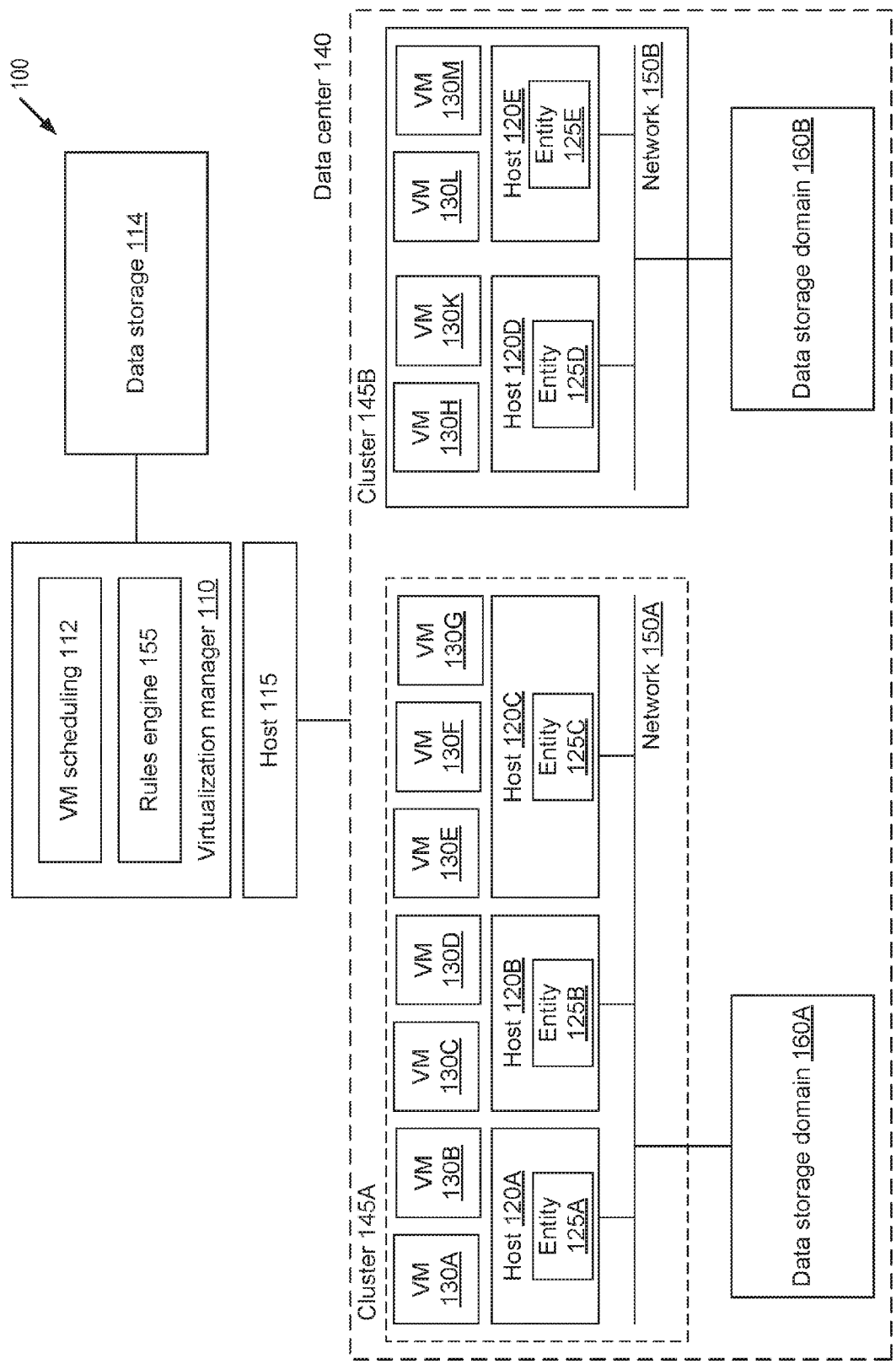
FIG. 1 depicts a high-level component diagram of one illustrative example of a distributed computer system representing a virtualized environment operating in accordance with one or more aspects of the present disclosure.

Implementations of the present disclosure describe a service for associating network interface cards (NICs) with virtual machines. A NIC is a hardware component of a host system that connects the host system to a network. For example, a NIC may route network traffic that is received at the NIC to one or more VMs that are supported by the host system. Thus, the NIC of the host system may provide interfaces between the underlying hardware of the host system and virtual devices of VMs.

The NICs may be indirectly or directly communicatively coupled to the VMs. When a NIC is indirectly communicatively coupled to a VM, the NIC may be coupled to the VM via a hypervisor. The hypervisor may implement processor virtualization to schedule time slots on one or more physical processors of a host system for multiple VMs that are supported by the host system. Thus, when the NIC is indirectly communicatively coupled to the VM via the hypervisor, the VM may share the resources of the host system with one or more other VMs. As such, network traffic received at the NIC for the host system may be directed to one of the multiple VMs that are supported by the host system. Otherwise, when the NIC is directly communicatively coupled to a VM, the NIC may be coupled directly to the VM via a communication channel or connection over a network. A direct communicative coupling between the NIC and the VM may enable the VM to have exclusive control over the resources of the host system. For example, when the NIC is directly communicatively coupled to the VM, the VM may be connected via a pass-through device (such as a PCI pass-through device) of the NIC to exclusively and directly connect the VM to the NIC. When the NIC is indirectly communicatively coupled to the VM, the NIC can be shared via a software switch and virtual ports (such as tap interface) with other VMs. Directly communicatively coupling the VM to the NIC may avoid traffic being sent to the VM through the software switch and the tap device and eliminate a latency incurred by these additional components in the communication path (e.g., network hops).

When a NIC is initially indirectly communicatively coupled to multiple VMs, a virtualization manager or a user of a VM may determine that to perform processing tasks for the VM, a direct communicative coupling between the VM and a host system may be preferred to enable the VM to have exclusive control of the resources of the host system. The exclusive control can enable the VM to have increased bandwidth and processing power as the VM no longer shares the resources of the host system with other VMs.

Switching a connection between the VM and the NIC from an indirect communicative coupling to a direct communicative coupling may be harmful to a VM or the host system of the NIC. For example, when the NIC is currently being used by multiple VMs, the virtualization manager directly communicatively coupling the NIC to a single VM may inadvertently disconnect the other VMs from the NIC and cause a system error. When the other VMs are disconnected from the NIC, the system error may cause a disruption or failure of processing tasks performed by the other VMs. Additionally, when the other VMs are disconnected from the NIC, the system error may include damage to files stored at the host system that were being accessed by the other VMs when the other VMs were disconnected from the NIC.

Aspects of the present disclosure overcome this and other deficiencies by providing systems and methods for directly communicatively coupling a NIC of a host system to a VM. When a virtualization manager receives a request from a client system to route network traffic directly from a first NIC of a first host system to a VM, the virtualization manager may determine whether the network traffic is routed between the VM and a first host system through the first NIC or the network traffic is routed between the VM and a second host system through a second NIC. When there is not network traffic being routed through the first NIC, the virtualization manager may directly communicatively couple the first host system to the VM. When there is network traffic being routed through the first NIC, the virtualization manager may identify a second NIC of a second host system that is available and associate the second NIC with the VM to route network traffic from the second NIC to the VM.

Thus, the present disclosure may provide an advantage of directly communicatively coupling the VM to the first NIC or the second NIC so that the VM can have exclusive access to the resources of the first host system associated with the first NIC or the second host system associated with the second NIC without disrupting other VMs that may be currently supported by one of the host systems.

FIG. 1 depicts a high-level component diagram of one illustrative example of a distributed computer system 100 representing a virtualized environment. In the illustrative example of FIG. 1, distributed computer system 100 includes a virtualization manager 110 and multiple host systems 120A-120E grouped into one or more clusters 145A-145B associated with a data center 140 that represents the highest level of abstraction in the virtualization model.

Virtualization manager 110 may include one or more software components being executed by a host system 115 for centralized management of the virtualized environment. The virtualization manager 110 may include various interfaces, including administrative interfaces, reporting interfaces, and/or application programming interfaces (APIs) to communicate to host systems 120A-120E of the managed virtualized environment, as well as to user portals, data stores, directory servers and various other components which are omitted from FIG. 1 for clarity.

The virtualization manager 110 may be communicatively coupled to a data store 114. The data store 114 may store network properties for the networks 150A and 150B in the distributed computer system 100. The network properties may include a virtual local area network (VLAN) identifier associated with network 150A or 150B, a maximum transmission unit (MTU) associated with a network 150A or 150B, or a quality of service (QoS) associated with network 150A or 150B, an internet protocol (IP) addresses of network 150A or 150B, a network identifier (ID) for network 150A or 150B, and so forth.

Each of host systems 115, 120A-120E may include one or more processing devices (CPUs) communicatively coupled to memory devices and input/output (I/O) devices. Each of host systems 120A-120E may run multiple VMs 130A-130M, by executing a hypervisor to abstract the physical layer, including processors, memory, and I/O devices, and present this abstraction to the VMs as virtual devices. The hypervisor may schedule time slots on one or more physical processors of host systems 120A-120E for VM 130A-130M. Each of host system 120A-120E may include one or more network entities 125A-E. The network entities 125A-E may be internet protocol (IP) interfaces, bridge interfaces, virtual local area network (VLAN) interfaces, network interface cards (NICs) bonds, or NICs. The hypervisor may run directly on the server hardware without an operating system (OS) beneath it or as an application running under an OS. The hypervisor may abstract the physical layer and present this abstraction to the VMs to use.

In another implementation, one or more VMs 130A-130M may be directly communicatively coupled to a host system 120A-120E to provide increased bandwidth and processing power to perform processing tasks for the VMs 130A-130M. For example, the VM 130A may be directly communicatively coupled to the host system 120A via the network entity 125A. The network entity 125A may be a NIC that directly connects the VM 130A to the host system 120A. The virtualization manager 110 may switch a connection between the VM 130A and the host system 120A from an indirect communicative coupling via the hypervisor to a direct communicative coupling via the network entity 125A. To perform the switch from the indirect communicative coupling to the direct communicative coupling, the virtualization manager 110 may determine when to perform the switch and which host system 120A-120E to connect the VM 130A to avoid causing an error in the distributed computer system 100.

A VM 130A-130M may execute a guest operating system which may utilize the underlying virtual devices, including virtual processors, virtual memory, and virtual I/O devices. One or more applications may be running on VM 130 under the guest operating system. Host systems of each cluster 145A-B may be communicatively coupled, via a network 150A-B, to one or more storage domains 160, including data storage domains 160A, 160B that store disk images of VMs 130.

Figure 2:
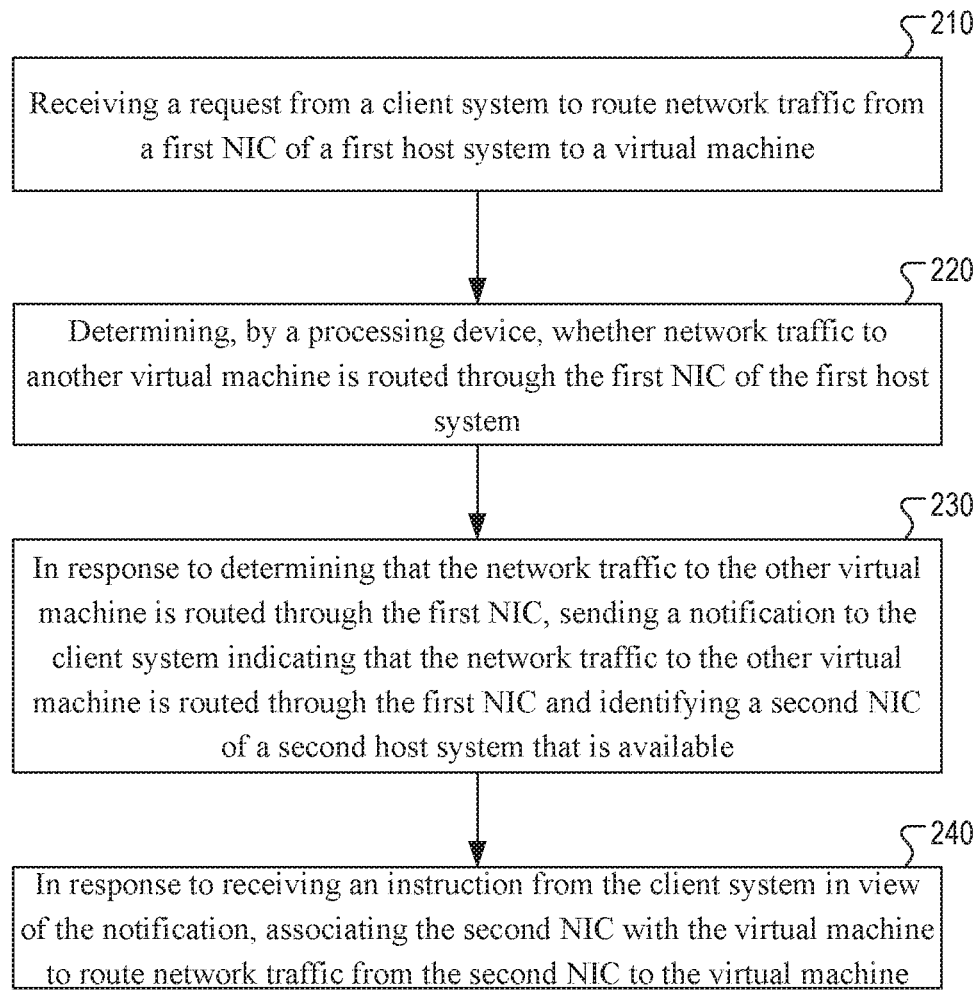
FIG. 2 depicts a flow diagram of one example of a method for associating a network interface card (NIC) with a virtual machine (VM).

FIG. 2 depicts a flow diagram of one example of a method 200 for associating a NIC with a VM. The method 200 may be performed by processing logic that may include hardware (circuitry, dedicated logic, etc.), computer programs (such that is run on a general-purpose computer system or a dedicated machine), or a combination of both. The method 200 may be performed in all or in part by the distributed computer system 100, the virtualization manager 110, the host systems 120A-120E, the clusters 145A-B, or the network 150A-B of FIG. 1.

At block 210, a processing device may receive a request from a client system to route network traffic from a first NIC of a first host system to a VM. The processing device may be a server or a computing device executing a virtualization manager. In one implementation, the request to route network traffic from the VM to the first NIC is a request to directly communicatively couple the first NIC to the VM. For example, the request can be to route any network traffic from the VM to the first NIC of first host system or to route any network traffic received at the first NIC to the VM.

At block 220, the processing device may determine whether network traffic to another VM is routed through the first NIC of the first host system. For example, a determination may be made as to whether network traffic to another VM is currently utilizing the first NIC of the first host system. The determination may be based on whether the network traffic was transmitted from the first NIC within a threshold period of time. In one example, the threshold period of time may be 5 minutes. In another example, the threshold period of time may be 5 seconds. When network traffic is determined to have been transmitted from the first NIC within a threshold period of time, then the first NIC may be considered to be unavailable to be directly communicatively coupled to the VM as another VM may be currently supported by the host system and/or is being used by another client system. Otherwise, when no network traffic has been transmitted from the first NIC within the threshold period of time, then the first NIC may be considered to be available to be directly communicatively coupled to the VM as another VM may not be currently supported by the host system.

At block 230, the processing device may send a notification to the client system indicating that the network traffic to the other VM is routed through the first NIC and identifying a second NIC that is available in response to determining that the network traffic to the other VM is being routed through the first NIC in response to determining that the network traffic to the other VM is being routed through the first NIC of the first host system. The configuration information of the first host system may be identified. A second host system with configuration information in the data store that at least partly matches the configuration information of the first host system may be identified. The configuration information for matching the first host system to the second host system may include, but is not limited to, processor types of the first and second host systems, a processing bandwidth of the first and second host systems, a memory capacity of the first and second host systems, and network entities coupled to the first and second host systems. After identifying the second host system that matches with the first host system, a second NIC that is associated with the second host system may be identified. In an implementation, a host system can include multiple NICs and the data store may include configuration information for each NIC of the host system. A second NIC that is available to be directly communicatively coupled may be identified by matching the configuration of the first NIC with the configuration information of the second NIC from the data store.

The second NIC may be available when the second NIC is free of the network traffic for the threshold period of time. The notification may be sent or transmitted in response to receiving an instruction from the first host system in view of the notification. The instruction may be to associate the second NIC with the VM to route network traffic from the second NIC to the VM by directly communicatively coupling the second NIC to the VM. The notification may indicate that network traffic to the other VM is being routed through the first NIC and that the first NIC is not available to be directly communicatively coupled with the VM. Furthermore, the notification may additionally identify the second NIC that is available and/or the second host system that includes the second NIC. The notification may further include configuration information of the second host system and/or the second NIC. In another example, a second notification may be sent or transmitted to the client system indicating that routing network traffic from the first NIC to the VM will cause a system error.

When the other VMs are disconnected from the host system, the system error may be a disruption or failure of processing tasks performed by the other VMs because of inadequate processing resources. Additionally, when the other VMs are disconnected from the host system, the system error may be the damaging of files stored at the host system that were being accessed by the other VMs when the other VMs were disconnected from the host system. The second notification may identify the other VMs that may be disconnected by switching the first NIC to a direct communicative coupling with the VM. The first notification may also identify the other VMs that may be disconnected. At block 240, in response to receiving an instruction from the client system in view of the notification, the processing device may associate the second NIC with the VM to route network traffic from the second NIC to the VM in response to receiving an instruction from the client system in view of the notification.

The network traffic may be received at and routed from the second NIC to the VM via a pass-through device when the second NIC is directly communicatively coupled with the VM. The pass-through device may be a device that allows a VM to have exclusive access to a host system for a range of processing tasks. For example, the pass-through device can isolate devices coupled to a host system so that the devices can be used exclusively by the VM when the VM is directly communicatively coupled to the second NIC. The processing tasks can include image processing, mathematical computational processing, data querying, and so forth. The pass-through device may include a universal serial bus (USB) pass-through device, an I/O pass-through device, a peripheral component interconnect (PCI) pass-through device, and so forth.

Figure 3:
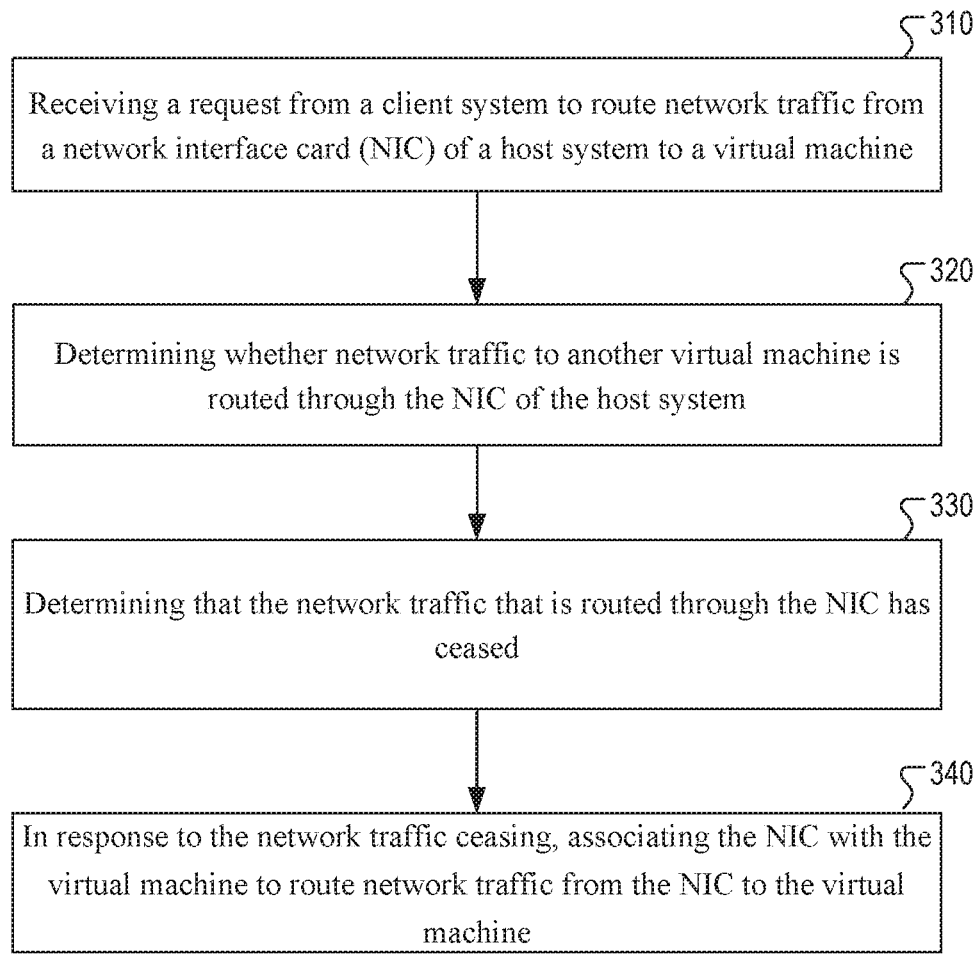
FIG. 3 depicts a flow diagram of one example of a method for associating a NIC with a VM to route network traffic from the NIC to the VM.

FIG. 3 depicts a flow diagram of an example method 300 for associating a NIC with a VM to route network traffic from the NIC to the VM. The method 300 may be performed by processing logic that may include hardware (circuitry, dedicated logic, etc.), computer programs (such as is run on a general-purpose computer system or a dedicated machine), or a combination of both. The method 300 may be performed in all or in part by the distributed computer system 100, the virtualization manager 110, the host systems 120A-120E, the clusters 145A-B, or the network 150A-B of FIG. 1.

At block 310, a processing device may receive a request from a client system to route network traffic from a NIC of a host system to a VM. The VM may be indirectly communicatively coupled to the NIC and share the host system with one or more other VMs. The processing device may be a server or a computing device executing a virtualization manager. At block 320, the processing device may determine whether network traffic to another VM is routed through the NIC of the host system. At block 330, the processing device may determine that the network traffic that is routed through the NIC has ceased. For example, the processing device may monitor the network traffic between the other VM and the host system to determine when the network traffic ceases being sent between the host system and the second VM.

At block 340, when the processing device determines that the network traffic has ceased, the processing device may associate the NIC with the VM to route the network traffic from the NIC to the VM. In one example, the processing device may associate the NIC with the VM when the NIC is free of network traffic for a threshold period of time.

Figure 4:
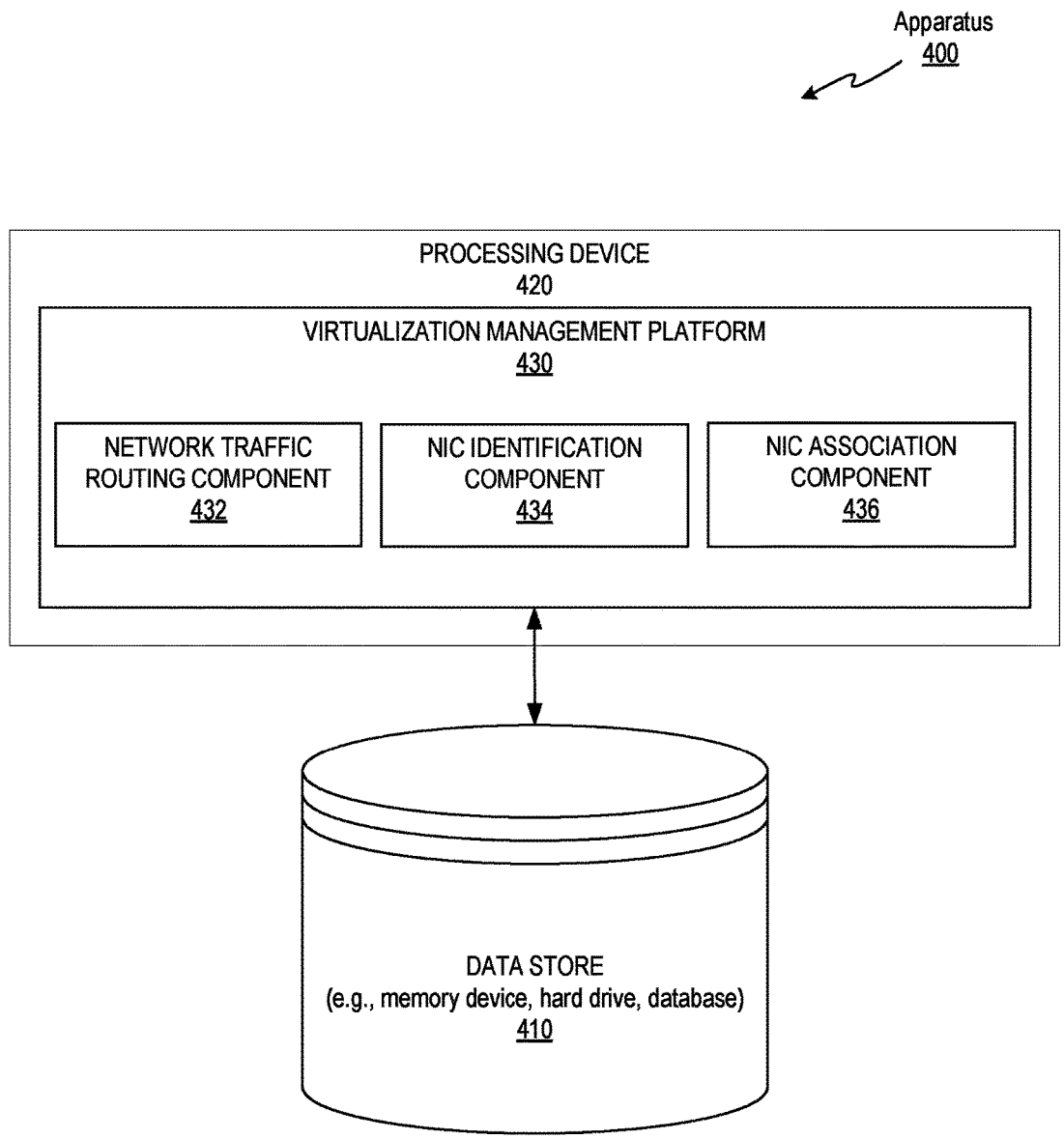
FIG. 4 illustrates an example apparatus in which implementations of the disclosure may operate.

FIG. 4 illustrates an example apparatus 400 in which implementations of the disclosure may operate. The apparatus 400 may be the same or similar to one of the distributed computer system 100, the virtualization manager 110, the host systems 120A-120E, the clusters 145A-B, or the network 150A-B, or other computing devices within the distributed computer system 100 of FIG. 1. The data store 410 may include any non-persistent data storage (e.g., memory), persistent data storage (e.g., flash storage, hard drive, tape), another medium, or combination thereof that is capable of storing instructions for carrying out the operations of the components and module discussed herein. The apparatus 400 may include a data store 410 that may store configuration information for host systems in a distributed computer system. The data store 410 may store information indicating one or more software layers running above a NIC. The software layers may include an internet protocol (IP) interfaces, bridge interfaces, virtual local area network (VLAN) interfaces, or NICs bonds. The one or more software layers running above the NIC can use the NIC or additional functionality to the NIC. For example the NIC bond can be software running above that NIC that bonds the NIC with one or more other NICs. The multiple NICs appear to be the same physical device to VMs and the host systems and have the same MAC address.

The apparatus 400 may include components and modules for modifying couplings between NICs and host systems in the distributed computer system. The apparatus 400 may include a processing device 420 with a virtualization management platform 430. The virtualization management platform 430 may include a network traffic routing component 432, a NIC identification component 434, and a NIC association component 436.

The network traffic routing component 432 may receive a request from a client system to route network traffic from a first NIC of a first host system to a VM. The network traffic routing component 432 may determine whether network traffic to another VM is routed through the first NIC of the first host system.

When the network traffic to the other VM is routed through the first NIC, the NIC identification component 434 may send a notification to the client system indicating that the network traffic to the other VM is routed through the first NIC. The NIC identification component 434 may identify a second NIC of a second host system that is available. In one example, the NIC identification component 434 may determine that network traffic was sent between the second VM and the host system within a threshold period of time. The NIC identification component 434 may monitor the network traffic between the second VM and the host system to determine when the network traffic ceases and the second NIC is available. In another example, the NIC identification component 434 may use the information in the data store 410 to determine that a network bridge is connected to the first NIC, where the network bridge is running on a first software layer above the first NIC. When the NIC identification component 434 determines that the network bridge is connected to the first NIC, the NIC identification component 434 may send the notification to the client system indicating that the first NIC is unavailable and identify the second NIC of the second host system that is available.

The ceasing of the network traffic indicates that the second NIC is available. In response to receiving the notification, the NIC association component 436 may associate the second NIC with the VM to route network traffic from the second NIC to the VM.

Figure 5:
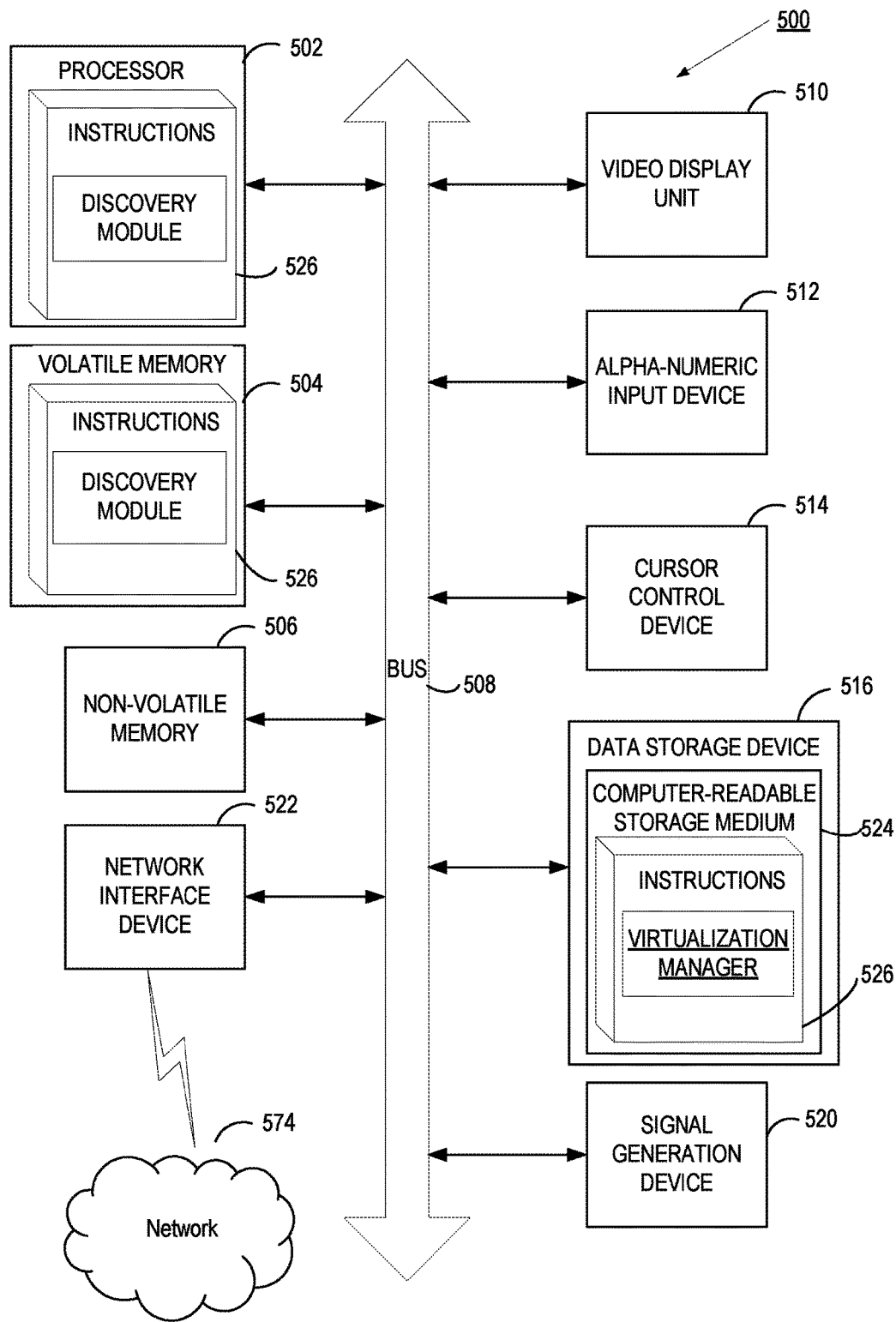
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to one or more of the distributed computer system 100, the virtualization manager 110, the host systems 120A-120E, the clusters 145A-B, or the network 150A-B, or other computing devices within the distributed computer system 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processor 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processor 502 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field-programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 200 and 300.

Instructions 526 may also reside, completely or partially, within volatile memory 504 and/or within processor 502 during execution thereof by computer system 500, hence, volatile memory 504 and processor 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that causes the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated into the functionality of other hardware components such as ASICS, FPGAs, DSPs or similar devices. In addition, the methods, components, and features may be implemented by computer program modules or functional circuitry within hardware devices. Further, the methods, components, and features may be implemented in any combination of hardware devices and computer program components, or only in computer programs.

Unless specifically stated otherwise, terms such as "loading," "transmitting," "receiving," "overwriting," "initiating," "discovering," "analyzing," or the like, refer to actions and processes performed or implemented by computer systems that manipulate and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 200 and 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, by a processing device of a second host system, a request from a client system to configure a first host system to route network traffic exclusively between a first network interface card (NIC) of the first host system and a first virtual machine executed by the first host system;
    determining, by the processing device, whether network traffic to a second virtual machine is currently routed through the first NIC;
    determining, by the processing device, that a second NIC of the first host system is available for exclusive routing to the first virtual machine, wherein the second NIC is available when configuration information of the second NIC of the first host system at least partially matches configuration information of the first NIC and that the second NIC is free of network traffic for a threshold period of time;
    in response to determining that the network traffic to the second virtual machine is currently routed through the first NIC, sending a notification to the client system indicating that the network traffic to the second virtual machine is currently routed through the first NIC and identifying the second NIC is available for exclusive routing to the first virtual machine;
    receiving an instruction from the client system in view of the notification, the instruction to configure the first host system to associate the second NIC with the first virtual machine to route the network traffic exclusively between the second NIC and the first virtual machine; and
    in response to receiving the instruction from the client system, associating the second NIC with the first virtual machine.

2. The method of claim 1, wherein the network traffic is routed exclusively between the second NIC and the first virtual machine via a pass-through device.

3. The method of claim 1, wherein determining whether the network traffic to the second virtual machine is routed through the first NIC comprises:
    determining whether the network traffic has been sent to the second virtual machine via the first NIC within a threshold period of time, wherein the sending of the notification is further in response to the network traffic being sent via the first NIC to the second virtual machine within the threshold period of time.

4. The method of claim 1, further comprising:
    determining that the first NIC is free of the network traffic for a threshold period of time; and
    communicatively coupling the first NIC to another virtual machine.

5. The method of claim 1, further comprising:
    maintaining a database of configuration information for a plurality of NICs that include at least the first NIC and the second NIC;
    determining the configuration information for the first NIC;
    identifying the configuration information in the database for the second NIC that matches the configuration information for the first NIC; and
    in response to the receiving the instruction from the client system, updating the database to associate the second NIC with the first virtual machine to route the network traffic exclusively between the second NIC and the first virtual machine.

6. The method of claim 5, wherein the determining that the second NIC is available for exclusive routing to the first virtual machine comprises
    determining that the second NIC is free of the network traffic for the threshold period of time.

7. The method of claim 1, further comprising:
    sending a second notification to the client system, wherein the second notification indicates that routing network traffic exclusively between the first NIC and the first virtual machine will cause a system error.

8. The method of claim 1, wherein the request to route network traffic exclusively between the first NIC and the first virtual machine is a request to directly communicatively couple the first NIC to the first virtual machine.

9. An apparatus comprising:
    a memory device;
    a processing device operatively coupled to the memory device, wherein the processing device is to:
        receive a request from a client system to configure a first host system to route network traffic exclusively between a first network interface card (NIC) of the first host system and a first virtual machine executed by the first host system;
        determine whether network traffic to a second virtual machine is currently routed through the first NIC;
        determine that a second NIC of the first host system is available for exclusive routing to the first virtual machine, wherein the second NIC is available when configuration information of the second NIC of the first host system at least partially matches configuration information of the first NIC and the second NIC is free of network traffic for a threshold period of time;
        in response to determining that the network traffic to the second virtual machine is currently routed through the first NIC, send a first notification to the client system indicating that the network traffic to the second virtual machine is currently routed through the first NIC and identify the second NIC is available for exclusive routing to the first virtual machine;
        receive an instruction from the client system in view of the first notification, the instruction to configure the first host system to associate the second NIC with the first virtual machine to route the network traffic exclusively between the second NIC and the first virtual machine; and in response to receiving the instruction from the client system, associate the second NIC with the first virtual machine.

10. The apparatus of claim 9, wherein the processing device is further to:
maintain a database of configuration information for a plurality of NICs that include at least the first NIC and the second NIC;
determine the configuration information for the first NIC;
identify the configuration information in the database for the second NIC; and
in response to the receiving the instruction from the client system, update the database to associate the second NIC with the first virtual machine to route network traffic exclusively between the second NIC and the first virtual machine.

11. The apparatus of claim 9, wherein the processing device is further to send a second notification to the client system, wherein the second notification indicates that routing network traffic exclusively between the first NIC and the first virtual machine will cause a system error.

12. The apparatus of claim 9, wherein the request to route network traffic exclusively between the first NIC and the first virtual machine is a request to directly communicatively couple the first NIC to the first virtual machine.

13. The apparatus of claim 9, wherein the processing device is further to:
maintain a database of one or more software layers running above the first NIC;
determine, using the database, that a network bridge is connected to the first NIC when the network bridge is running on a first software layer above the first NIC;
in response to determining that the network bridge is connected to the first NIC, send a second notification to the client system indicating that the first NIC is unavailable and identify the second NIC that is available; and
in response to receiving a second instruction from the client system in view of the second notification, associate the second NIC with the first virtual machine to route network traffic exclusively between the second NIC and the first virtual machine.

14. The apparatus of claim 9, wherein the processing device is further to:
maintain a database of configuration information for a plurality of NICs that include at least the first NIC and the second NIC;
determine the configuration information for the first NIC;
identify the configuration information in the database for the second NIC that matches the configuration information for the first NIC; and
in response to the configuration information for the second NIC matching the configuration information for the first NIC, determine that the second NIC is available.

15. The apparatus of claim 9, wherein the processing device is further to:
determine that network traffic was sent between the second virtual machine and the first NIC within a threshold period of time; and
monitor the network traffic between the second virtual machine and the first NIC to determine when the network traffic ceases, wherein the ceasing of the network traffic indicates the first NIC is available.

16. The method of claim 1, wherein the first host system and the second host system are the same host system.

17. A non-transitory computer-readable storage medium, having instructions stored therein, which when executed, cause a processing device to:

receive a request from a client system to configure a first host system to route network traffic exclusively between a first network interface card (NIC) of the first host system and a first virtual machine executed by the first host system;
determine whether network traffic to a second virtual machine is currently routed through the first NIC;
determine that a second NIC of the first host system is available for exclusive routing to the first virtual machine, wherein the second NIC is available when configuration information of the second NIC of the first host system at least partially matches configuration information of the first NIC and that the second NIC is free of network traffic for a threshold period of time;
in response to determining that the network traffic to the second virtual machine is currently routed through the first NIC, send a notification to the client system indicating that the network traffic to the second virtual machine is currently routed through the first NIC and identifying the second NIC is available for exclusive routing to the first virtual machine;
receive an instruction from the client system in view of the notification, the instruction to configure the first host system to associate the second NIC with the first virtual machine to route the network traffic exclusively between the second NIC and the first virtual machine; and
in response to receiving the instruction from the client system, associate the second NIC with the first virtual machine.

18. The non-transitory computer-readable storage medium of claim 17, wherein the network traffic is routed exclusively between the second NIC and the first virtual machine via a pass-through device.

19. The non-transitory computer-readable storage medium of claim 17, wherein, to determine whether the network traffic to the second virtual machine is routed through the first NIC, the processing device is further to:
determine whether the network traffic has been sent to the second virtual machine via the first NIC within a threshold period of time, wherein the notification is sent in response to the network traffic being sent via the first NIC to the second virtual machine within the threshold period of time.

20. The non-transitory computer-readable storage medium of claim 17, wherein the processing device is further to:
determine that the first NIC is free of the network traffic for a threshold period of time; and
communicatively couple the first NIC to another virtual machine.

21. The non-transitory computer-readable storage medium of claim 17, wherein the processing device is further to:
maintain a database of configuration information for a plurality of NICs that include at least the first NIC and the second NIC;
determine the configuration information for the first NIC;
identify the configuration information in the database for the second NIC that matches the configuration information for the first NIC; and
in response to receiving the instruction from the client system, update the database to associate the second NIC with the first virtual machine to route the network traffic exclusively between the second NIC and the first virtual machine.

* * * * *